United States Patent
Ma et al.

(10) Patent No.: US 12,500,641 B2
(45) Date of Patent: Dec. 16, 2025

(54) SUBBAND REPORTING FOR CHANNEL STATE INFORMATION OF MULTIPLE TRANSMISSION RECEPTION POINTS

(71) Applicant: QUALCOMM Incorporated, San Diego, CA (US)

(72) Inventors: Ruifeng Ma, Beijing (CN); Bo Chen, Beijing (CN); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 17/907,935

(22) PCT Filed: Apr. 29, 2020

(86) PCT No.: PCT/CN2020/087726
§ 371 (c)(1),
(2) Date: Aug. 29, 2022

(87) PCT Pub. No.: WO2021/217481
PCT Pub. Date: Nov. 4, 2021

(65) Prior Publication Data
US 2023/0108166 A1 Apr. 6, 2023

(51) Int. Cl.
*H04B 7/06* (2006.01)
*H04L 1/06* (2006.01)
(Continued)

(52) U.S. Cl.
CPC ......... *H04B 7/0626* (2013.01); *H04L 1/0693* (2013.01); *H04L 27/26025* (2021.01); *H04W 72/0457* (2023.01)

(58) Field of Classification Search
CPC ............... H04B 7/0626; H04L 1/0693; H04L 27/26025; H04W 72/0457
See application file for complete search history.

(56) References Cited

U.S. PATENT DOCUMENTS

2016/0345310 A1 11/2016 Hunukumbure
2019/0230549 A1* 7/2019 Wang ................... H04B 7/0639
(Continued)

FOREIGN PATENT DOCUMENTS

CN 107733499 A 2/2018
CN 107888268 A 4/2018
(Continued)

OTHER PUBLICATIONS

ETSI, "TS 38.214 V15.9.0", Apr. 2020, pp. 1-109 (Year: 2020).*
(Continued)

*Primary Examiner* — Salvador E Rivas
(74) *Attorney, Agent, or Firm* — Harrity & Harrity, LLP

(57) ABSTRACT

Various aspects of the present disclosure generally relate to wireless communication. In some aspects, a user equipment (UE) may determine one or more per-subband preferences, that specify transmission reception points (TRPs) from which the UE is to measure channel state information reference signals (CSI-RSs), based at least in part on a CSI-RS resource indicator (CRI) format indicator that indicates a quantity of preferences per subband. The UE may transmit, to a base station, a CRI report based at least in part on the one or more per-subband preferences. Numerous other aspects are provided.

25 Claims, 12 Drawing Sheets

(51) Int. Cl.
  *H04L 27/26* (2006.01)
  *H04W 72/0457* (2023.01)

(56) References Cited

U.S. PATENT DOCUMENTS

| | | | |
|---|---|---|---|
| 2019/0260448 A1 | 8/2019 | Rahman et al. | |
| 2020/0177254 A1* | 6/2020 | Lee | H04B 7/063 |
| 2020/0228182 A1* | 7/2020 | Nilsson | H04B 7/0647 |

FOREIGN PATENT DOCUMENTS

| | | |
|---|---|---|
| CN | 108352938 A | 7/2018 |
| WO | WO-2018231812 A1 | 12/2018 |
| WO | 2019022657 A1 | 1/2019 |

OTHER PUBLICATIONS

R1-1713353, "Discussion on PRB grid and RBG determination" Aug. 21-25, 2017, pp. 1-5 (Year: 2017).*
R1-1701717, "Enhanced CRI reporting for NR MIMO", Feb. 13-17, 2017, pp. 1-3 (Year: 2017).*
Rohde & Schwarz, "LTE-Advanced Pro Introduction eMBB Technology Components in 3GPP Release 13/14 White paper", 2017, pp. 1-50 (Year: 2017).*
CATT: "Discussion on CSI reporting in NR", 3GPP TSG RAN WG1 AH_NR Meeting, R1-1700224, Spokane, USA, Jan. 16-20, 2017, Jan. 10, 2017, 4 Pages.
Huawei., et al., "Maintenance for CSI Acquisition", 3GPP TSG RAN WG1 Meeting #94bis, R1-1810099 Chengdu, China, Oct. 8-12, 2018, 6 Pages, TheWhole Document.
International Search Report and Written Opinion—PCT/CN2020/087726—ISA/EPO—Jan. 28, 2021.

* cited by examiner

```
-- ASN1START
-- TAG-CSI-RESOURCECONFIG-START

CSI-ResourceConfig ::=     SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList   SEQUENCE (SIZE (1..maxNrofNZP-CSI-RS-ResourceSetsPerConfig)) OF NZP-
CSI-RS-ResourceSetId OPTIONAL, -- Need R
            csi-SSB-ResourceSetList      SEQUENCE (SIZE (1..maxNrofCSI-SSB-ResourceSetsPerConfig)) OF CSI-SSB-
ResourceSetId OPTIONAL  -- Need R
        },
        csi-IM-ResourceSetList      SEQUENCE (SIZE (1..maxNrofCSI-IM-ResourceSetsPerConfig)) OF CSI-IM-
ResourceSetId
    },
    bwp-Id                      BWP-Id,
    resourceType                ENUMERATED { aperiodic, semiPersistent, periodic },
    crbg-ReuseConfigSubbandSize ENUMERATED {true, false} OPTIONAL -- NeedR
    crbg-Size                   ENUMERATED {value1, value2} OPTIONAL
}
```

FIG. 10

SUBBAND REPORTING FOR CHANNEL STATE INFORMATION OF MULTIPLE TRANSMISSION RECEPTION POINTS

CROSS-REFERENCE TO RELATED APPLICATIONS

This application is a 371 national stage of PCT Application No. PCT/CN2020/087726 filed on Apr. 29, 2020, entitled "SUBBAND REPORTING FOR CHANNEL STATE INFORMATION OF MULTIPLE TRANSMISSION RECEPTION POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for subband reporting for channel state information of multiple transmission reception points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining one or more per-subband preferences, that specify transmission reception points (TRPs) from which the UE is to measure channel state information reference signals (CSI-RSs), based at least in part on a CSI-RS resource indicator (CRI) format indicator that indicates a quantity of preferences per subband. The method may include transmitting, to a base station, a CRI report based at least in part on the one or more per-subband preferences.

In some aspects, a method of wireless communication, performed by a base station, may include transmitting, to a UE, a format indicator that indicates a format for one or more per-subband preferences that specify TRPs from which the UE is to measure CSI-RSs. The method may include receiving a CRI report that includes measurements for the one or more per-subband preferences, and scheduling subbands for the UE based at least in part on the CRI report.

In some aspects, a UE for wireless communication may include a memory and one or more processors operatively coupled to the memory. The memory and the one or more processors may be configured to determine one or more per-subband preferences, that specify TRPs from which the UE is to measure CSI-RSs, based at least in part on a CRI format indicator that indicates a quantity of preferences per subband, and transmit, to a base station, a CRI report based at least in part on the one or more per-subband preferences.

In some aspects, a base station for wireless communication may include a memory and one or more processors operatively coupled to the memory. The memory and the one or more processors may be configured to transmit, to a UE, a format indicator that indicates a format for one or more per-subband preferences that specify TRPs from which the UE is to measure CSI-RSs, receive a CRI report that includes measurements for the one or more per-subband preferences, and schedule subbands for the UE based at least in part on the CRI report.

In some aspects, a non-transitory computer-readable medium may store one or more instructions for wireless communication. The one or more instructions, when executed by one or more processors of a UE, may cause the one or more processors to determine one or more per-subband preferences, that specify TRPs from which the UE is to measure CSI-RSs, based at least in part on a CRI format indicator that indicates a quantity of preferences per subband, and transmit, to a base station, a CRI report based at least in part on the one or more per-subband preferences.

In some aspects, a non-transitory computer-readable medium may store one or more instructions for wireless communication. The one or more instructions, when executed by one or more processors of a base station, may cause the one or more processors to transmit, to a UE, a format indicator that indicates a format for one or more per-subband preferences that specify TRPs from which the UE is to measure CSI-RSs, receive a CRI report that includes measurements for the one or more per-subband preferences, and schedule subbands for the UE based at least in part on the CRI report.

In some aspects, an apparatus for wireless communication may include means for determining one or more per-subband preferences, that specify TRPs from which the apparatus is to measure CSI-RSs, based at least in part on a CRI format indicator that indicates a quantity of preferences per subband, and means for transmitting, to a base station, a CRI report based at least in part on the one or more per-subband preferences.

In some aspects, an apparatus for wireless communication may include means for transmitting, to a UE, a format indicator that indicates a format for one or more per-subband preferences that specify TRPs from which the UE is to measure CSI-RSs, means for receiving a CRI report that includes measurements for the one or more per-subband preferences, and means for scheduling subbands for the UE based at least in part on the CRI report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is an example of a CRI resource block group configuration, in accordance with various aspects of the present disclosure.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
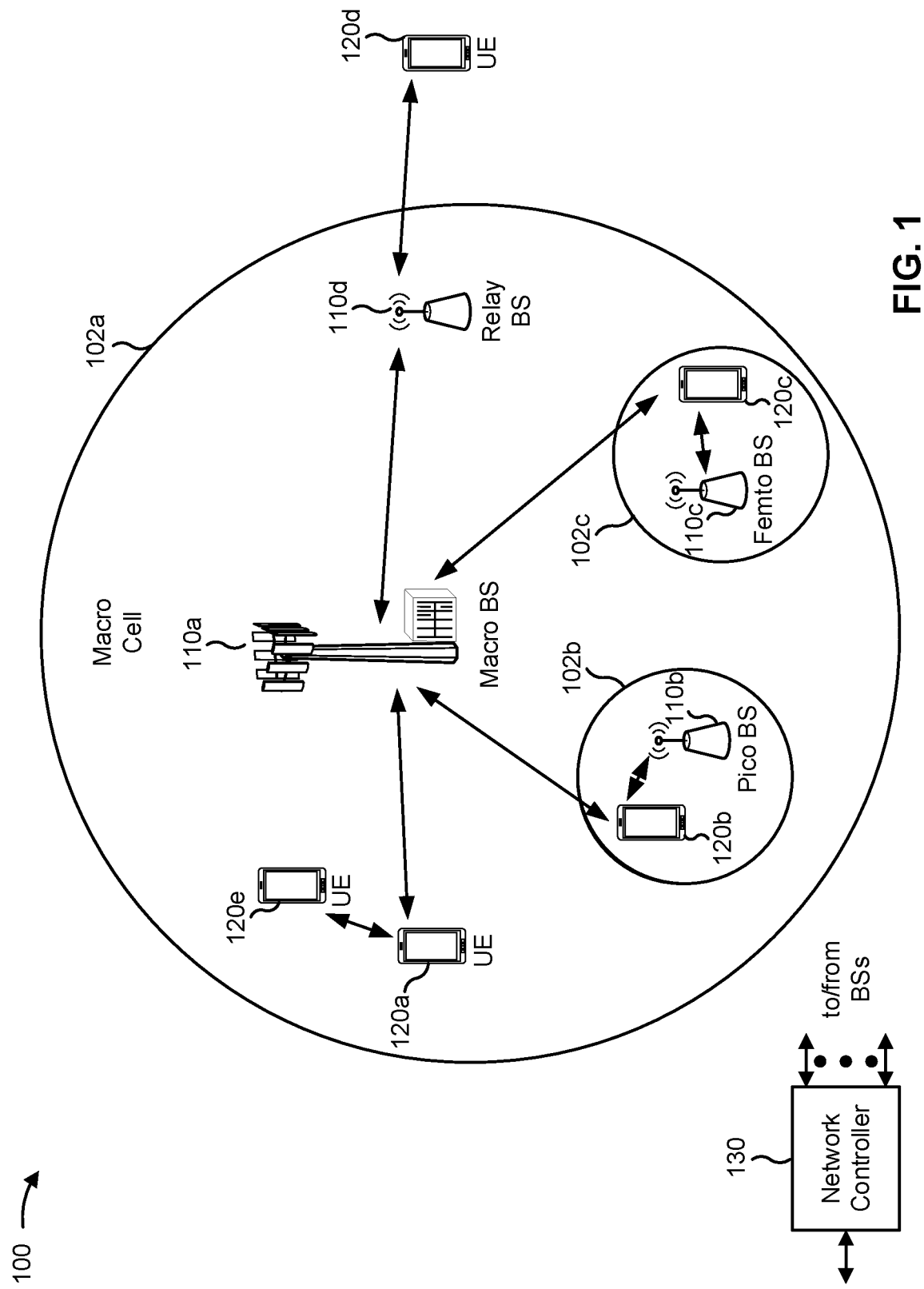
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
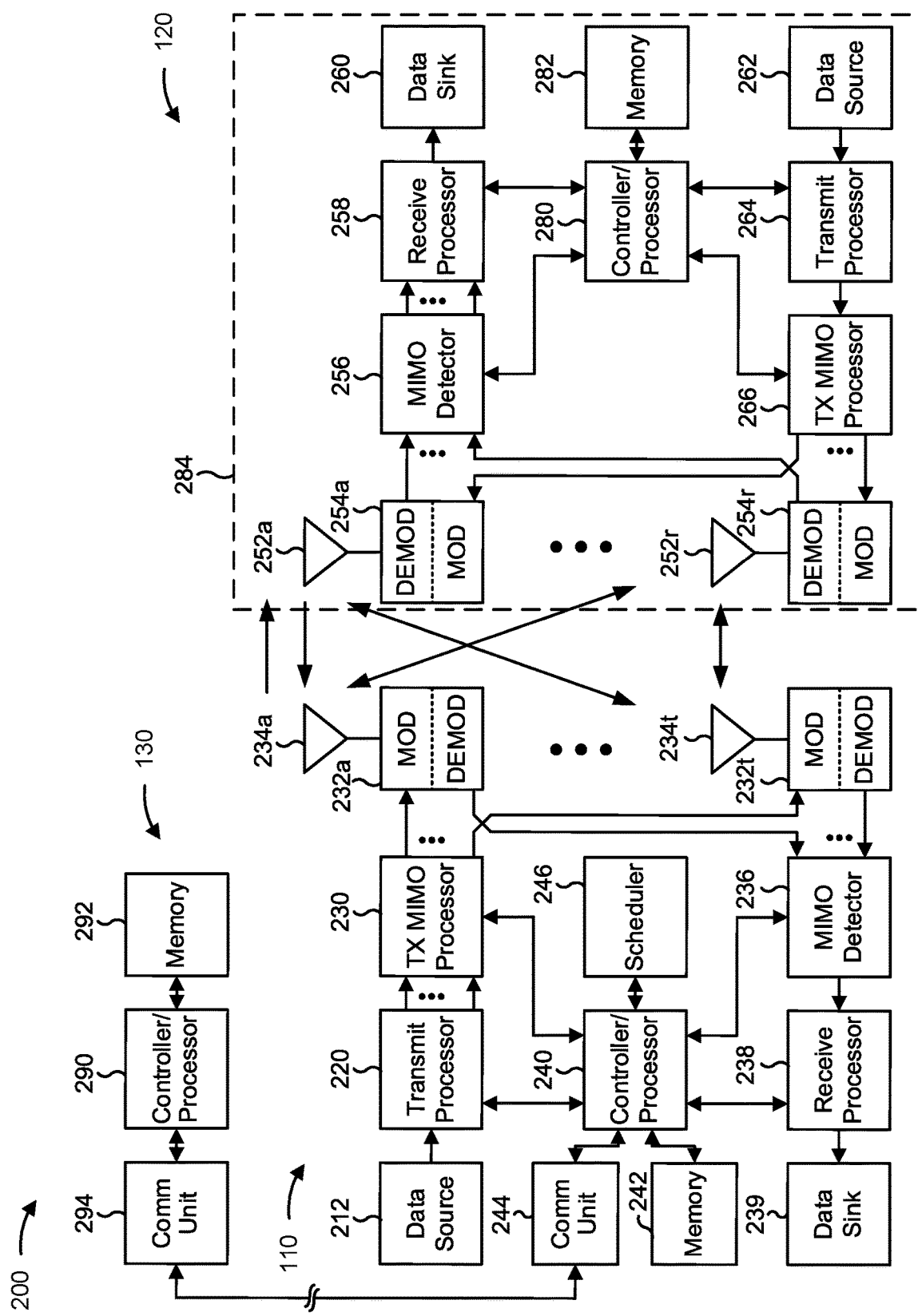
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-12.

Controller/processor 240 of base station 110, controller/processor 280 of UE 120, and/or any other component(s) of FIG. 2 may perform one or more techniques associated with subband reporting for CSI of multiple TRPs, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1100 of FIG. 11, process 1200 of FIG. 12, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining one or more per-subband preferences, that specify TRPs from which the UE is to measure CSI-RSs, based at least in part on a CRI format indicator that indicates a quantity of preferences per subband, means for transmitting, to a base station, a CRI report based at least in part on the one or more per-subband preferences, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a format indicator that indicates a format for one or more per-subband preferences that specify TRPs from which the UE is to measure CSI-RSs, means for receiving a CRI report that includes measurements for the one or more per-subband preferences, means for scheduling subbands for the UE based at least in part on the CRI report and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
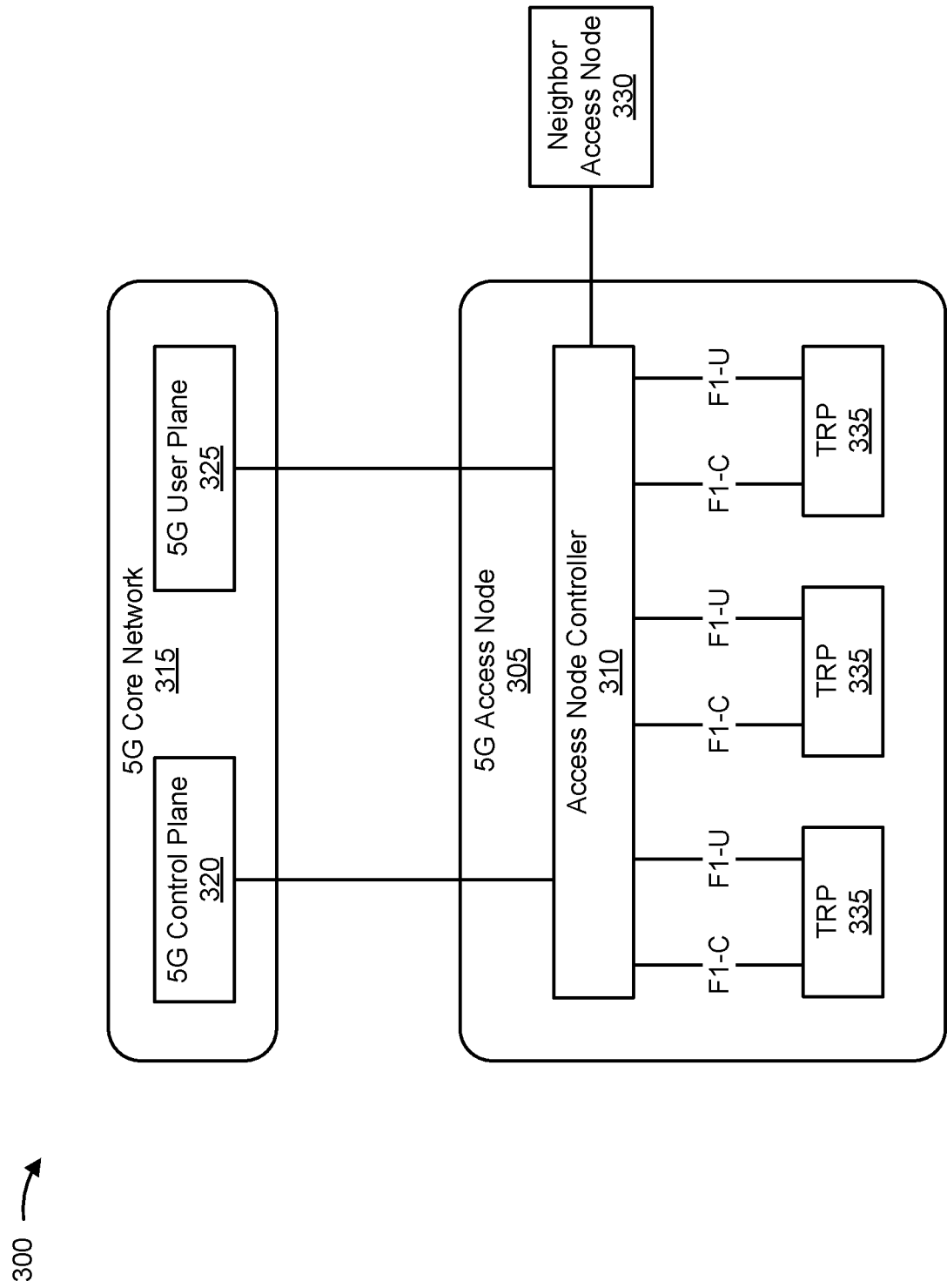
FIG. 3 illustrates an example logical architecture of a distributed radio access network, according to aspects of the present disclosure.

FIG. 3 illustrates an example logical architecture of a distributed radio access network (RAN) 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
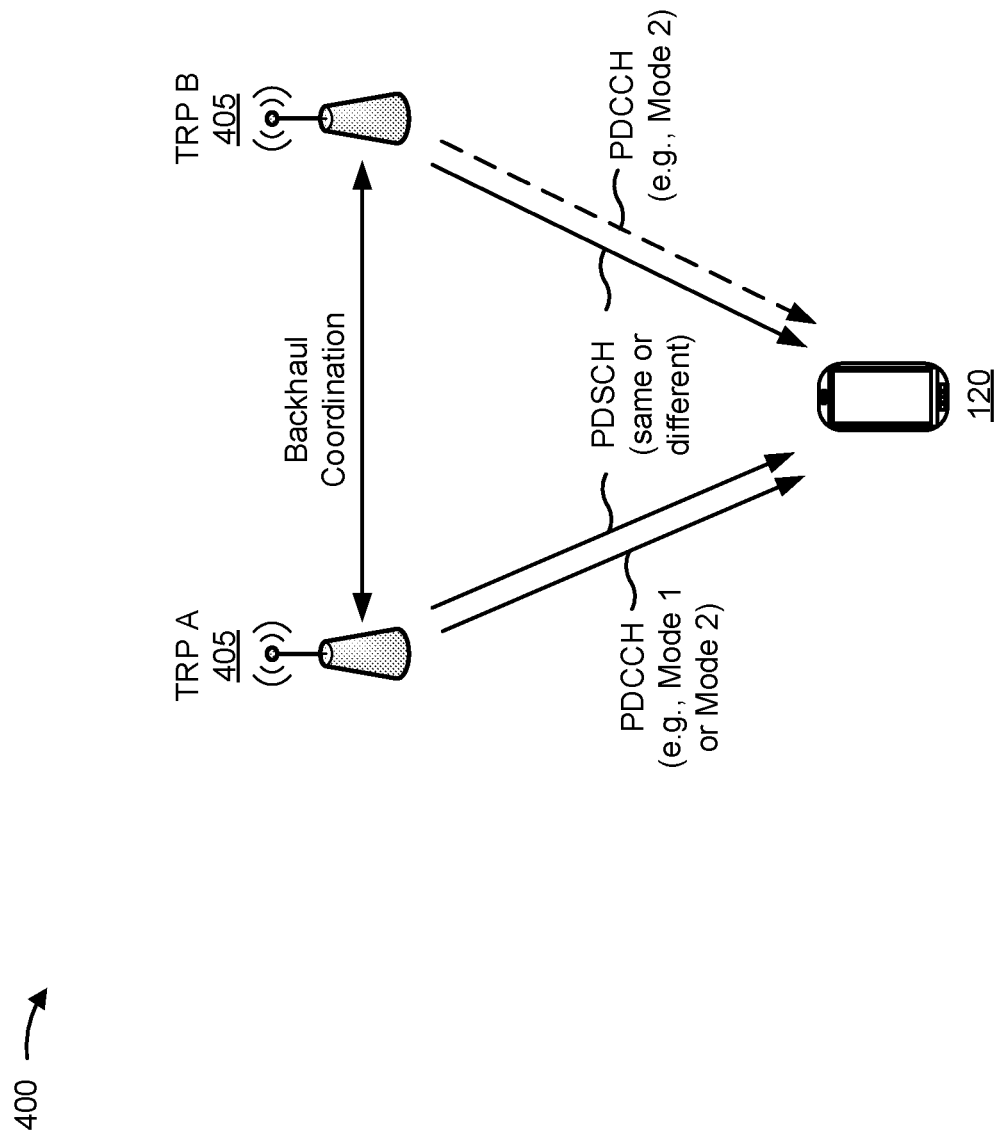
FIG. 4 is a diagram illustrating an example of multi-transmission reception point (TRP) communication, in accordance with various aspects of the present disclosure.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint (CoMP) transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., mTRP Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second mTRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
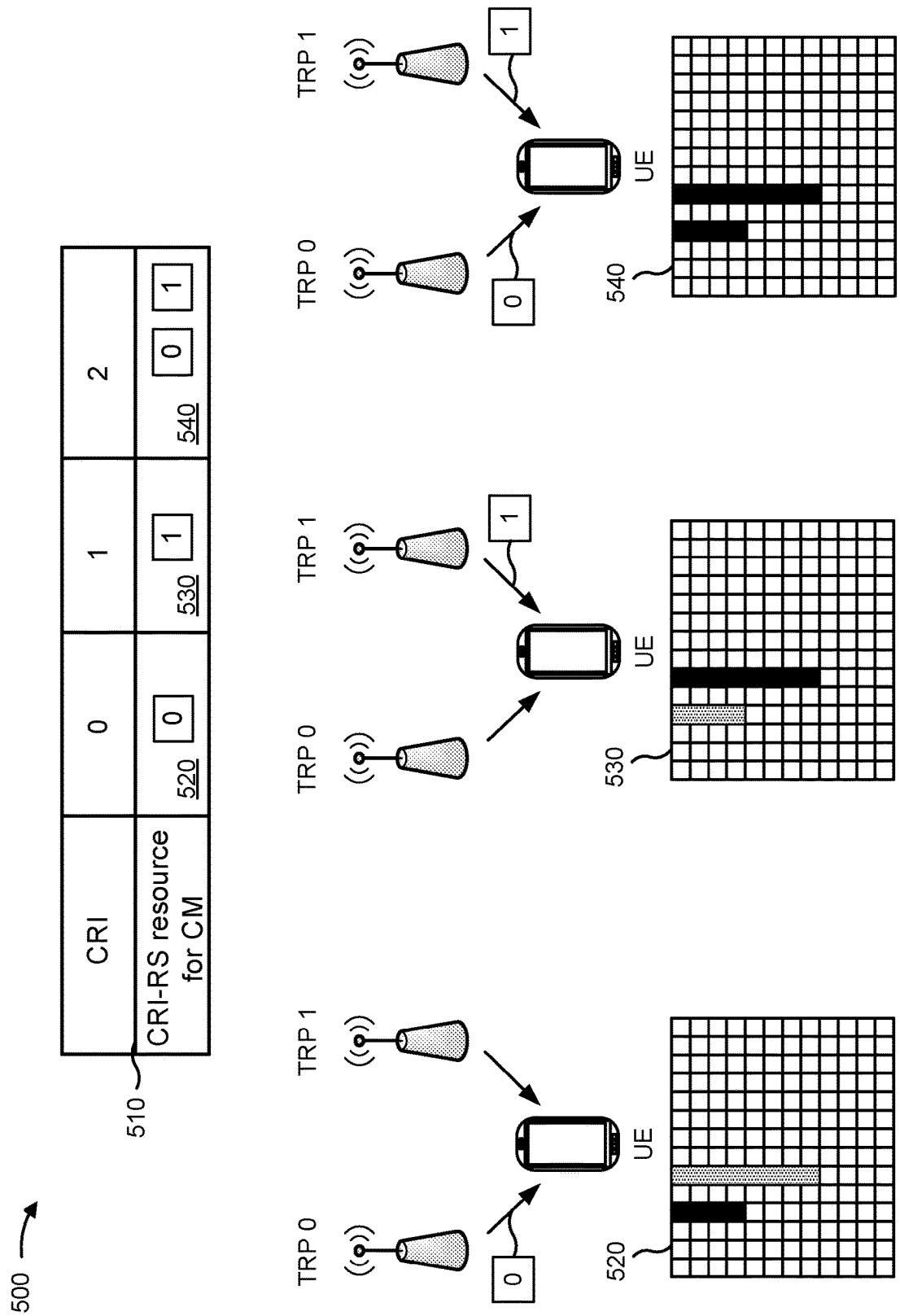
FIG. 5 is a diagram illustrating an example of channel state information (CSI) reference signal report indicator (CRI) reporting for multiple TRPs, in accordance with various aspects of the present disclosure.

FIG. 5 is a diagram illustrating an example 500 of CRI reporting for multiple TRPs, in accordance with various aspects of the present disclosure. FIG. 5 shows a table 510 indicating CSI-RS resources (e.g., CSI in resource elements) to be used for channel measurement by a UE (e.g., a UE depicted in FIGS. 1, 2 and 4).

In LTE's further enhancements to CoMP (FeCoMP) operation and in NR operation for mTRP CSI, a CSI measurement set may include two TRPs with three possible hypotheses (TRP0, TRP1, TRP0 & TRP1). Each hypothesis may be mapped to a TCI (beam configuration) of the UE, with a single TCI configured per CSI-RS resource. The UE may perform CSI measurements according to a selected hypothesis. That is, the UE may perform measurements on CSI-RSs from one or both TRPs, according to whichever hypothesis the UE has selected (or been instructed) to use.

The UE may provide a wideband CRI report to indicate CSI-RSs from a single TRP or to indicate non-coherent joint transmission (NCJT) by two TRPs. For example, as shown by table 510 in FIG. 5, a CRI report value of 0 indicates channel measurements (CM) of CSI-RS resources 520 from TRP0. A CRI report value of 1 indicates channel measurements of CSI-RS resources 530 from TRP1. A CRI report value of 2 indicates channel measurements of CSI-RS resources 540 from both TRP0 and TRP1.

The UE may use one of multiple NR CSI report quantity configurations, which are assumed to apply for a wideband frequency of the UE (all configured frequencies for the UE). Report quantity types may be defined in a higher layer parameter (e.g., CSI-ReportConfig) and may include, for example, "cri-RI-PMI-CQI" or "CRI-RI-LI-PMI-CQI" with a "cqi-FormatIndicator" set to "wideband CQI" and a "pmi-FormatIndicator" set to "widebandPMI". RI is a rank indicator, PMI is a pre-coding matrix indicator, LI is a layer indicator, and CQI is a channel quality indicator. A report quantity type of "cri-RI-CQI" or "cri-RI-i1-CQI" may have a "cqi-FormatIndicator" set to "wideband CQI." Other report quantities may include "cri-RI-i1", "cri-RSRP", or "ssb-Index-RSRP".

A UE may provide a CRI report using a preference for measuring CSI-RSs from a single TRP or multiple TRPs. For example, as shown in FIG. 5, a UE may have a preference for channel measurements of CSI-RS resources 520 for TRP0, CSI-RS resources 530 for TRP1, or CSI-RS resources 540 for TRP0 and TRP1. CRI reporting by a UE is specified for a wideband and for a channel starting frequency. From a base station (e.g., gNB) perspective, the UE only reports mTRP preferences for the wideband. However, wideband preferences may not convey a complete report if channel qualities varies from subband to subband. As a result, the gNB is not able to schedule UEs efficiently if a CSI-RS resource preference for one subband should be different than a preference for another subband or the whole wideband. Scheduling inefficiencies lead to degraded communications and/or wasted signaling resources.

As indicated above, FIG. 5 is provided as an example. Other examples may differ from what is described with respect to FIG. 5.

Figure 6:
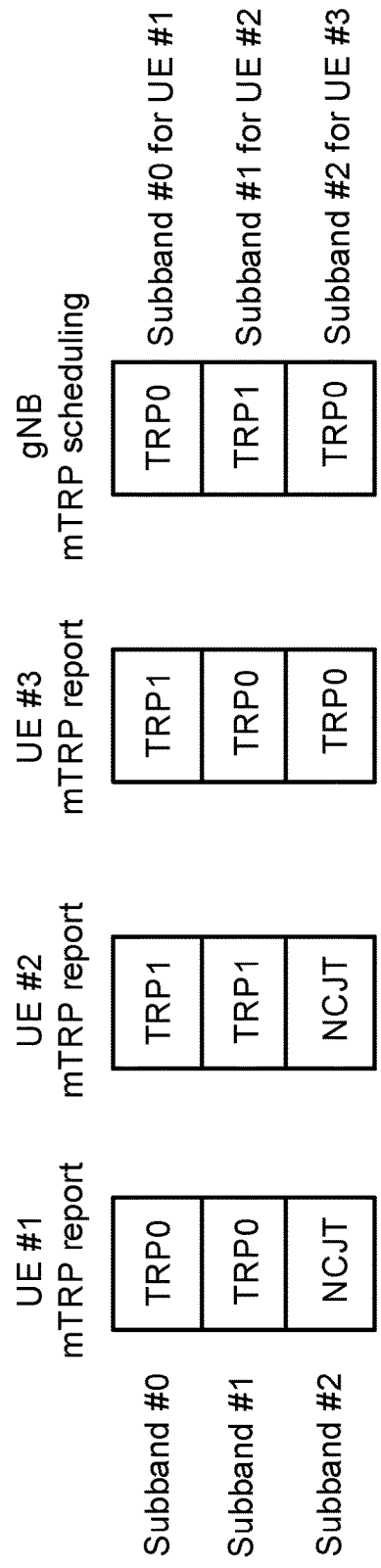
FIG. 6 is a diagram illustrating an example of subband reporting for CSI of multiple TRPs, in accordance with various aspects of the present disclosure.

FIG. 6 is a diagram illustrating an example 600 of subband reporting for CSI of multiple TRPs, in accordance with various aspects of the present disclosure. FIG. 6 shows per-subband CRI reports for mTRP transmission for three subbands (#0, #1, and #2). FIG. 6 also shows subband scheduling for UEs.

According to various aspects described herein, subband scheduling for different UEs may provide higher cell throughputs, and subband scheduling is made possible by the UE reporting CRI using per-subband preferences. Per-subband preferences are more optimal than a wideband preference, because the best preference for a particular subband may not be the same preference for the wideband or other subbands. Per-subband CRI reporting for mTRP provides more comprehensive information and flexibility for the gNB, and the gNB may schedule UEs for particular subbands with more accurate information.

FIG. 6 shows an example 600 of per-subband CRI reporting. As shown in FIG. 6, a first UE (UE #1) may provide a per-subband CRI report for multiple TRPs. For, example UE #1 may provide channel measurements for CSI-RS resources of TRP0 for subband #0 and channel measurements for CSI-RS resources of TRP0 for subband #1. However, for subband #2, the UE may provide channel measurements for CSI-RS resources jointly transmitted from both TRP0 and TRP1. UE #2 may provide channel measurements for CSI-RS resources of TRP1 for subband #0 and channel measurements for CSI-RS resources of TRP1 for subband #1. For subband #2, the UE may also provide channel measurements for CSI-RS resources jointly transmitted from both TRP0 and TRP1. UE #3 may provide channel measurements for CSI-RS resources of TRP1 for subband #0, channel measurements for CSI-RS resources of TRP0 for subband #1, and channel measurements for CSI-RS resources of TRP0 for subband #2. As a result, the gNB may schedule the UEs for specific subbands based at least in part on the channel measurements reported by the UEs for the specific subbands. For example, as shown in FIG. 6, the gNB may schedule UE #1 with TRP0 for subband #0, UE #2 with TRP1 for subband #1, and UE #3 with TRP0 for subband #2.

In some aspects, the UE may be configured with an RI and/or for CQI estimation that is subband specific. CQI estimation may be done jointly across multiple physical resource blocks (PRBs) and/or subbands, or separately over each subband. If the UE knows how granular a CRI report is to be (wideband or subband), the UE may use this information to determine how granular the CQI estimation is to be (e.g., across different PRBs and/or subbands).

The UE may not be aware of what per-subband preferences the UE may or should use to help the gNB schedule subbands for the UE. According to various aspects described herein, a gNB may configure the UE with a per-subband format for providing preferences that specify TRPs from which the UE is to measure CSI-RSs. For example, the gNB may transmit a CRI format indicator to the UE that specifies a quantity of preferences per subband. The format indicator may indicate that the UE is to select a single preference per subband, two or more preferences per subband, a specific number of preferences per subband, and/or the like. The UE may use the format indicator to determine one or more preferences per subband and transmit a CRI report to the base station based at least in part on the one or more subband preferences. Because the UE is provided with a per-subband format for reporting CRI, the gNB may receive per-subband CRI reports for multiple TRPs and schedule a subband for a UE with more frequency-granular CSI information. As a result, the gNB and the UE avoid wasting signaling resources due to degraded communications that may occur for a UE in a particular subband.

As indicated above, FIG. 6 is provided as an example. Other examples may differ from what is described with respect to FIG. 6.

Figure 7:
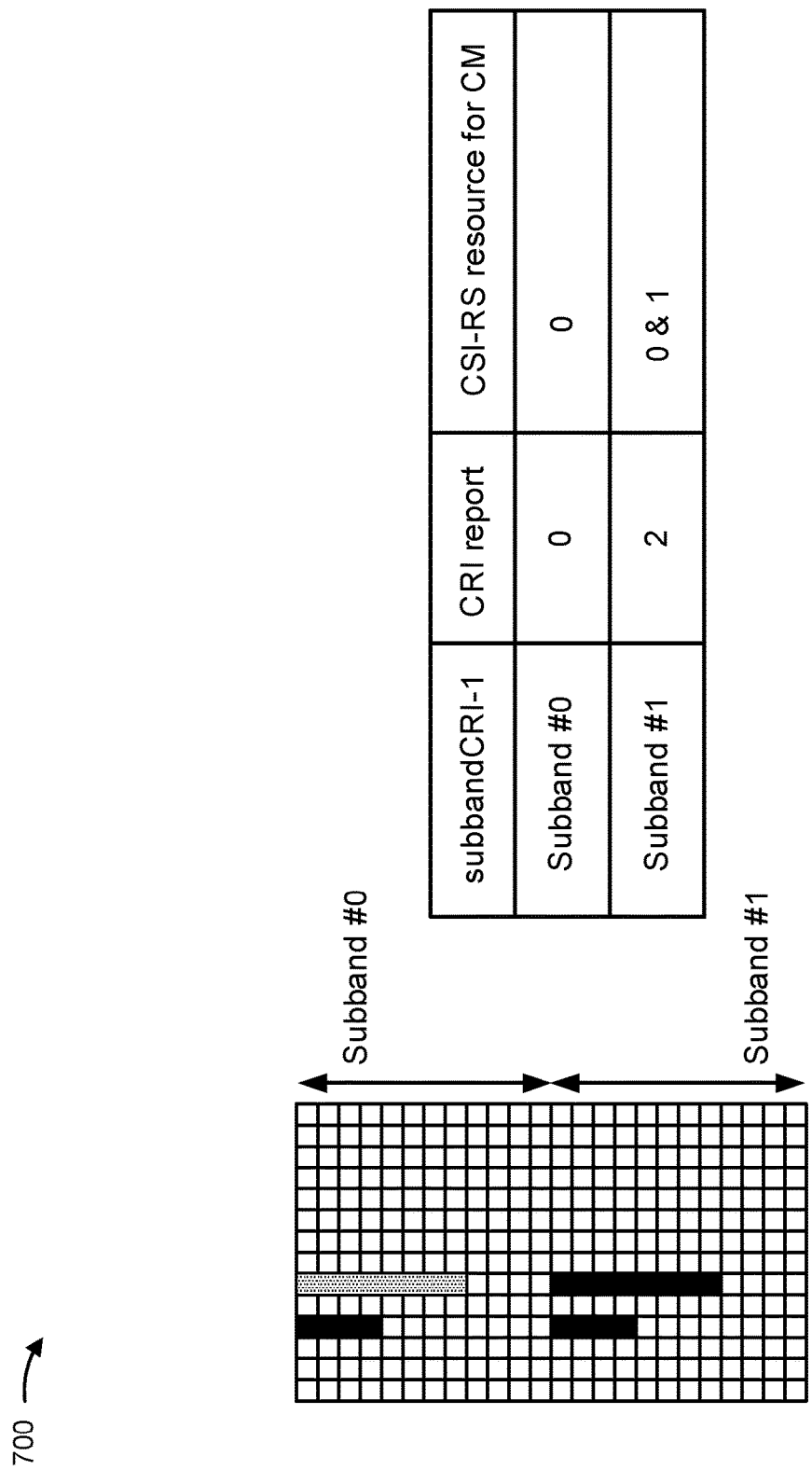
FIG. 7 is a diagram illustrating an example of subband reporting for CSI of multiple TRPs, in accordance with various aspects of the present disclosure.

FIG. 7 is a diagram illustrating an example 700 of subband reporting for CSI of multiple TRPs, in accordance with various aspects of the present disclosure. FIG. 7 shows that for a format indicator of "subbandCRI-1", there is a single preference per subband.

For example, the UE may determine, for subband #0, a CRI report value of 0, which indicates that the CSI-RS resource for channel measurements will be from TRP0. The UE may determine, for subband #1, a CRI report value of 2, which indicates that the CSI-RS resource for channel measurements will be from both TRP0 and TRP1. In some aspects, the UE may indicate an RI and/or a CQI for each subband.

As indicated above, FIG. 7 is provided as an example. Other examples may differ from what is described with respect to FIG. 7.

Figure 8:
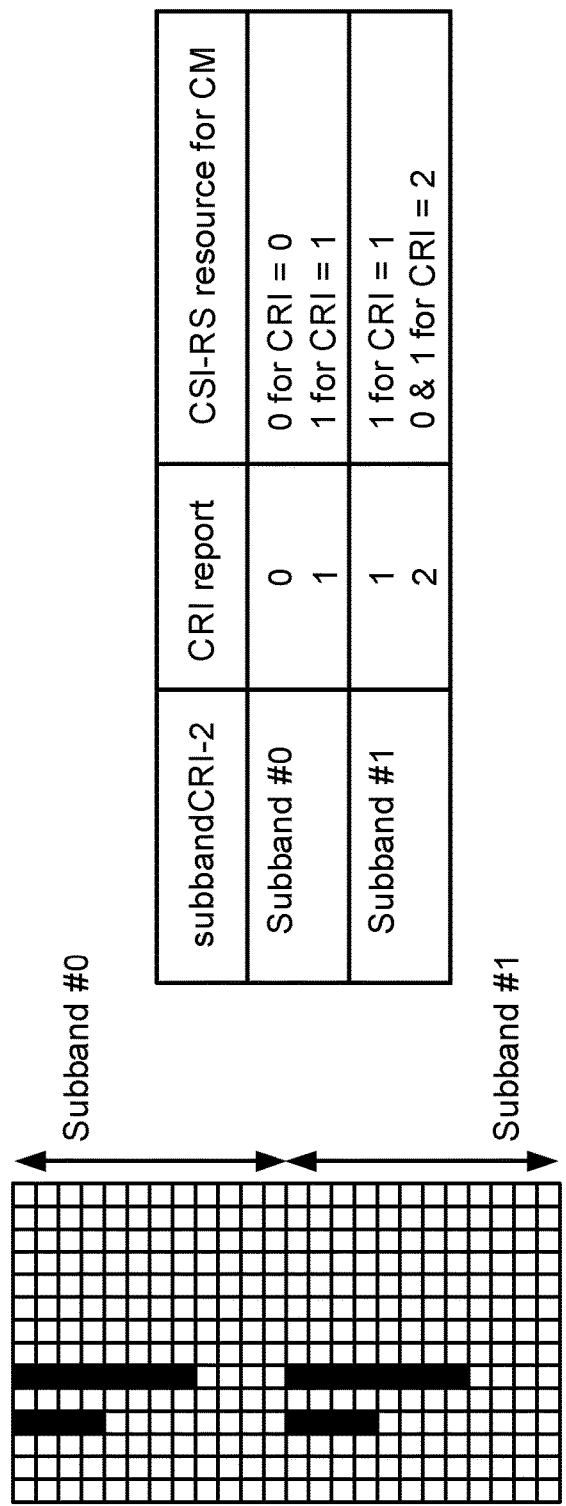
FIG. 8 is a diagram illustrating an example of subband reporting for CSI of multiple TRPs, in accordance with various aspects of the present disclosure.

FIG. 8 is a diagram illustrating an example 800 of subband reporting for CSI of multiple TRPs, in accordance with various aspects of the present disclosure. FIG. 8 shows that for a format indicator of "subbandCRI-2", there are two preferences per subband.

For example, the UE may determine, for subband #0, that a first preference will be a CRI report value of 0 and that a second preference will be a CRI report value of 1. The UE may determine, for subband #1, that a first preference will be a CRI report value of 1 and that a second preference will be a CRI report value of 2. With multiple preferences per subband, the gNB is able to configure the UE to have more flexibility in preference selection and use. If the first preference is not available or appropriate for channel conditions, the UE may use the second preference. The gNB may receive a CRI report for this second preference and schedule the UE accordingly for a subband.

As indicated above, FIG. 8 is provided as an example. Other examples may differ from what is described with respect to FIG. 8.

Figure 9:
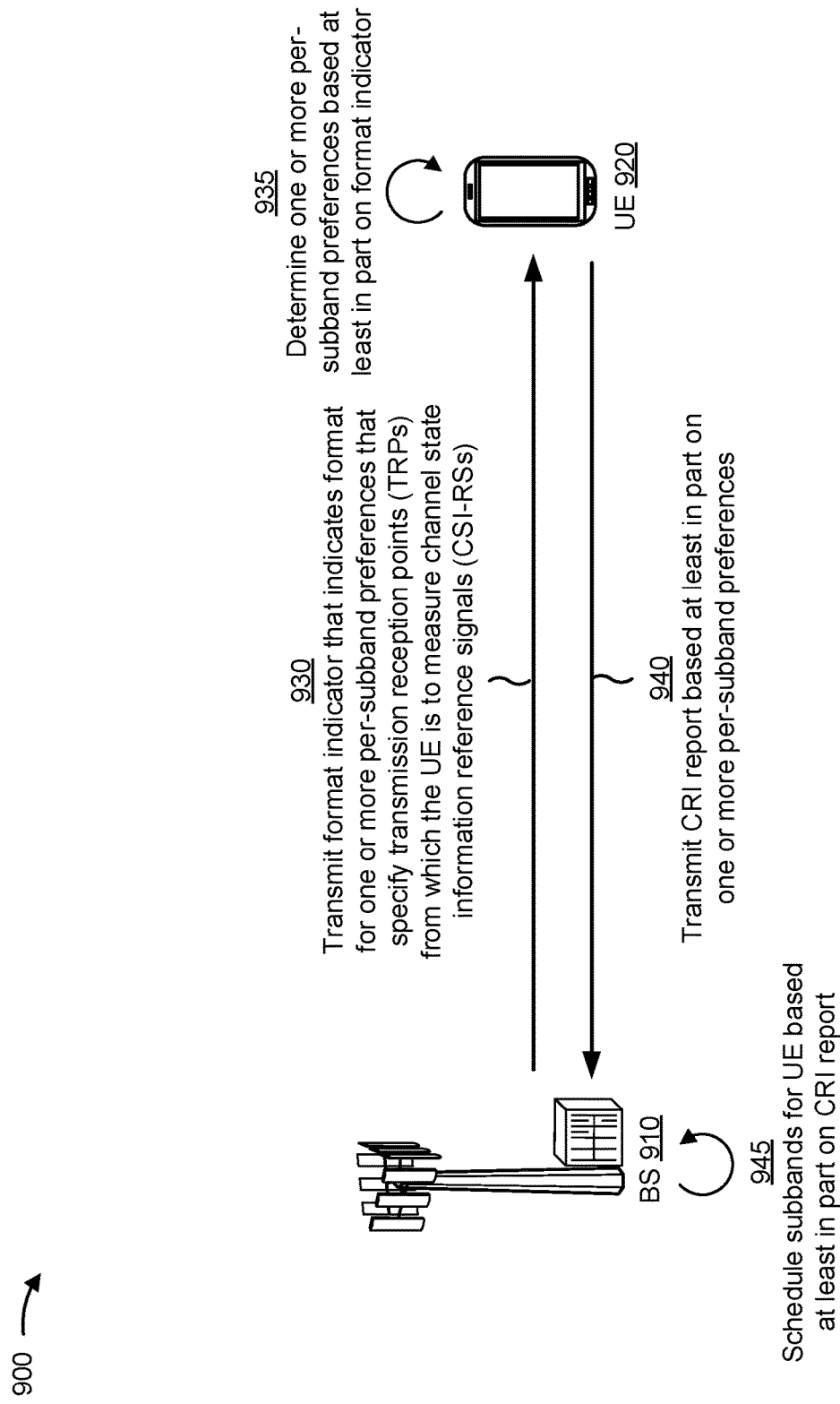
FIG. 9 is a diagram illustrating an example of subband reporting for CSI of multiple TRPs, in accordance with various aspects of the present disclosure.

FIG. 9 is a diagram illustrating an example 900 of subband reporting for CSI of multiple TRPs, in accordance with various aspects of the present disclosure. FIG. 9 shows a base station (BS) 910 (e.g., a BS 110 depicted in FIGS. 1 and 2, an access node 305 depicted in FIG. 3, and/or the like) and a UE 920 (a UE 120 depicted in FIGS. 1, 2, and 4, and/or the like) that may communicate with each other. BS 910 may provide configuration information to UE 920 for channel measurements from one or more TRPs (e.g., a TRP 335 depicted in FIG. 3, a TRP 405 depicted in FIG. 4, TRP0 and/or TRP1 depicted in FIG. 5, and/or the like).

As shown by reference number 930, BS 910 may transmit a format indicator to UE 920 for CRI reporting. The format indicator may indicate a format for one or more per-subband preferences. A preference may specify CSI-RS resources for channel measurement. For example, a preference may indicate specific TRPs from which the UE is to measure CSI-RSs. CSI-RSs may include CSI-RSs for channel measurements, CSI-RSs for interference measurement (IM), non-zero power (NZP) CSI-RSs for IM, and/or the like.

A format may specify a quantity of preferences per subband. In some aspects, the format may specify a single preference per subband. In some aspects, the format may specify two single preferences per subband. In some aspects, the format may specify three preferences per subband, and so forth. For any number of preferences, the format indicator may indicate an RI and/or a CQI per subband. In some aspects, the format may be applicable to multiple subbands or all subbands of the wideband, and this format may be equivalent to a legacy format for wideband CRI reporting (e.g., "widebandCRI").

As shown by reference number 935, UE 920 may determine one or more per-subband preferences based at least in part on the format indicator for CRI reporting. Accordingly, UE 920 may perform channel measurements, interference measurements, and/or the like on CSI-RS resources for one or more TRPs based at least in part on how many preferences are specified by the format. UE 920 may prepare a CRI report based at least in part on the measurements. In some aspects, BS 910 may specify CSI-RS resources for one or more preferences.

As shown by reference number 940, UE 920 may transmit the CRI report. As shown by reference number 945, BS 910 may schedule one or more subbands for UE 920 based at least in part on the CRI report. For example, BS 910 may schedule UE 920 for a subband that had more favorable measurements. The UE may be scheduled to use a particular TRP based at least in part on previous information reported for the TRP from UE 920, information reported from other UEs, information about channel conditions, information about UE configurations, and/or the like.

In some aspects, UE 920 may measure CSI-RS resources of varying sizes. For example, UE 920 may use a CRI report resource block group (CRBG) size for the CRI report. BS 910 may configure UE 920 with the CRBG size via higher layer signaling, such as via an RRC message. BS 910 may transmit a size indicator indicating the CRBG size or information for determining the CRBG size. In some aspects, BS 910 may configure UE 920 to reuse a size from among a quantity of known sizes from a CSI report configuration. For example, UE 920 may determine whether a CRBG size for the CRI report is a same size as a subband size of the CSI report configuration. UE 920 may prepare the CRI report based at least in part on the CRBG size.

In some aspects, UE 920 may determine the CRBG size for the CRI report to be a size indicated in a specified table. UE 920 may reuse the size from the specified table based at least in part on a size indicator being set to a first state (e.g., flag set to true). In some aspects, the CRBG size may be, for example, one of multiple possible CRBG sizes. The CRBG size may be equal to a subband size defined in a CSI report configuration. The CRBG size may be defined as a specified quantity of contiguous physical RBs (PRBs). The CRBG size may be based at least in part on a total quantity of PRBs in a bandwidth part, according to the specified table.

Alternatively, UE 920 may determine the CRBG size from a configuration message, based at least in part on the size indicator being set to a second state (e.g., flag set to false). BS 910 may indicate the size (e.g., crbg-Size) in the configuration message. With a configured CRBG size, UE 920 has more flexibility for preparing the CRI report.

In some aspects, to reduce feedback overhead, BS 910 may configure the CRBG size to be an integer multiple of a CSI report configuration subband size, and BS 910 may indicate the multiplier to be used. UE 920 may receive an indication of the multiplier and determine the CRBG size for the CRI report to be the multiplier times the subband size in the CSI report configuration. In some aspects, the multiplier may be applied in either frequency division multiplexing or time division multiplexing. The multiplier may be applied without a PMI report.

As indicated above, FIG. 9 is provided as an example. Other examples may differ from what is described with respect to FIG. 9.

FIG. 10 is an example 1000 of a CRBG configuration, in accordance with various aspects of the present disclosure. FIG. 10 shows an example of at least two additions to a CSI report configuration. In some aspects, the addition may include an indication of whether the CRBG size is a known size from a CSI report configuration stored on UE 920. This may involve a flag set to true or false. In some aspects, the addition may include an indication of the CRBG size and/or information that is used to determine the CRBG size.

As indicated above, FIG. 10 is provided as an example. Other examples may differ from what is described with respect to FIG. 10.

Figure 11:
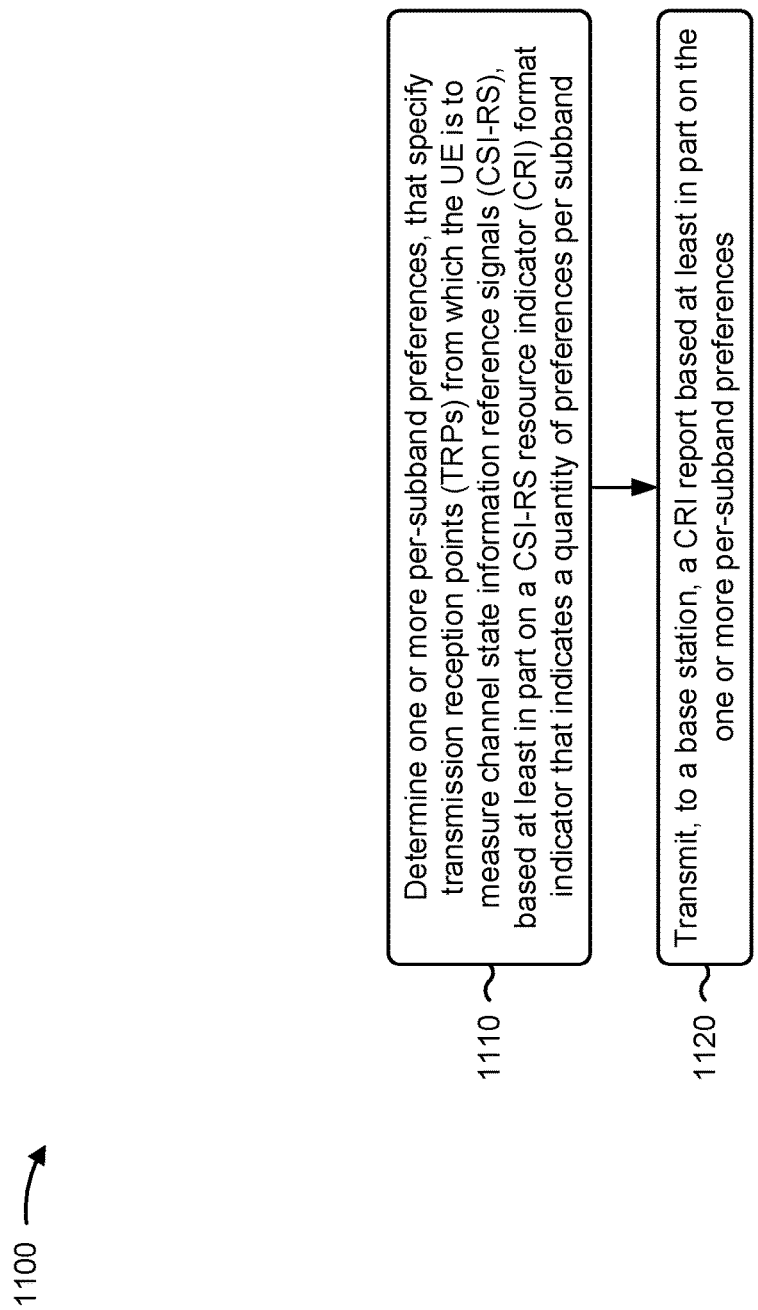
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., a UE 120 depicted in FIGS. 1, 2 and 4, the UE depicted in FIG. 5, UE 920 depicted in FIG. 9, and/or the like) performs operations associated with subband report for CSI of multiple TRPs.

As shown in FIG. 11, in some aspects, process 1100 may include determining one or more per-subband preferences, that specify TRPs from which the UE is to measure CSI-RSs, based at least in part on a CRI format indicator that indicates a quantity of preferences per subband (block 1110). For example, the UE (e.g., using receive processor 258, transmit processor 264, controller/processor 280, memory 282, and/or the like) may determine one or more per-subband preferences, that specify TRPs from which the UE is to measure CSI-RSs, based at least in part on a CRI format indicator that indicates a quantity of preferences per subband, as described above.

As further shown in FIG. 11, in some aspects, process 1100 may include transmitting, to a base station, a CRI report based at least in part on the one or more per-subband preferences (block 1120). For example, the UE (e.g., using receive processor 258, transmit processor 264, controller/processor 280, memory 282, and/or the like) may transmit, to a base station, a CRI report based at least in part on the one or more per-subband preferences, as described above.

Process 1100 may include additional aspects, such as any single aspect or any combination of aspects described below and/or in connection with one or more other processes described elsewhere herein.

In a first aspect, the CRI format indicator indicates that the UE is to select a single preference per subband.

In a second aspect, alone or in combination with the first aspect, a preference selected for one subband is different than a preference selected for another subband.

In a third aspect, alone or in combination with one or more of the first and second aspects, the CRI format indicator indicates that the UE is to select two or more preferences per subband.

In a fourth aspect, alone or in combination with one or more of the first through third aspects, the CRI format indicator indicates that the one or more per-subband preferences are the same for all subbands.

In a fifth aspect, alone or in combination with one or more of the first through fourth aspects, the CRI format indicator indicates that the UE is to select a RI and a CQI value per subband.

In a sixth aspect, alone or in combination with one or more of the first through fifth aspects, the CSI-RSs include one or more of CSI-RSs for channel measurements, CSI-RSs for IM, or NZP CSI-RSs for IM.

In a seventh aspect, alone or in combination with one or more of the first through sixth aspects, process 1100 includes receiving the CRI format indicator from the base station.

In an eighth aspect, alone or in combination with one or more of the first through seventh aspects, process 1100 includes determining whether a CRBG size for the CRI report is a same size as a subband size of a CSI report configuration based at least in part on a size indicator, and preparing the CRI report based at least in part on the CRBG size.

In a ninth aspect, alone or in combination with one or more of the first through eighth aspects, process 1100 includes determining the CRBG size for the CRI report to be a size indicated in a specified table based at least in part on the size indicator being set to true.

In a tenth aspect, alone or in combination with one or more of the first through ninth aspects, process 1100 includes determining the CRBG size for the CRI report to be a size specified in a configuration message based at least in part on the size indicator being set to false.

In an eleventh aspect, alone or in combination with one or more of the first through tenth aspects, process 1100 includes determining a CRBG size for the CRI report to be an integer multiple of a subband size of a CSI report configuration.

In a twelfth aspect, alone or in combination with one or more of the first through eleventh aspects, process 1100 includes measuring CSI-RSs from TRPs according to the one or more per-subband preferences and preparing the CRI report based at least in part on measuring the CSI-RSs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
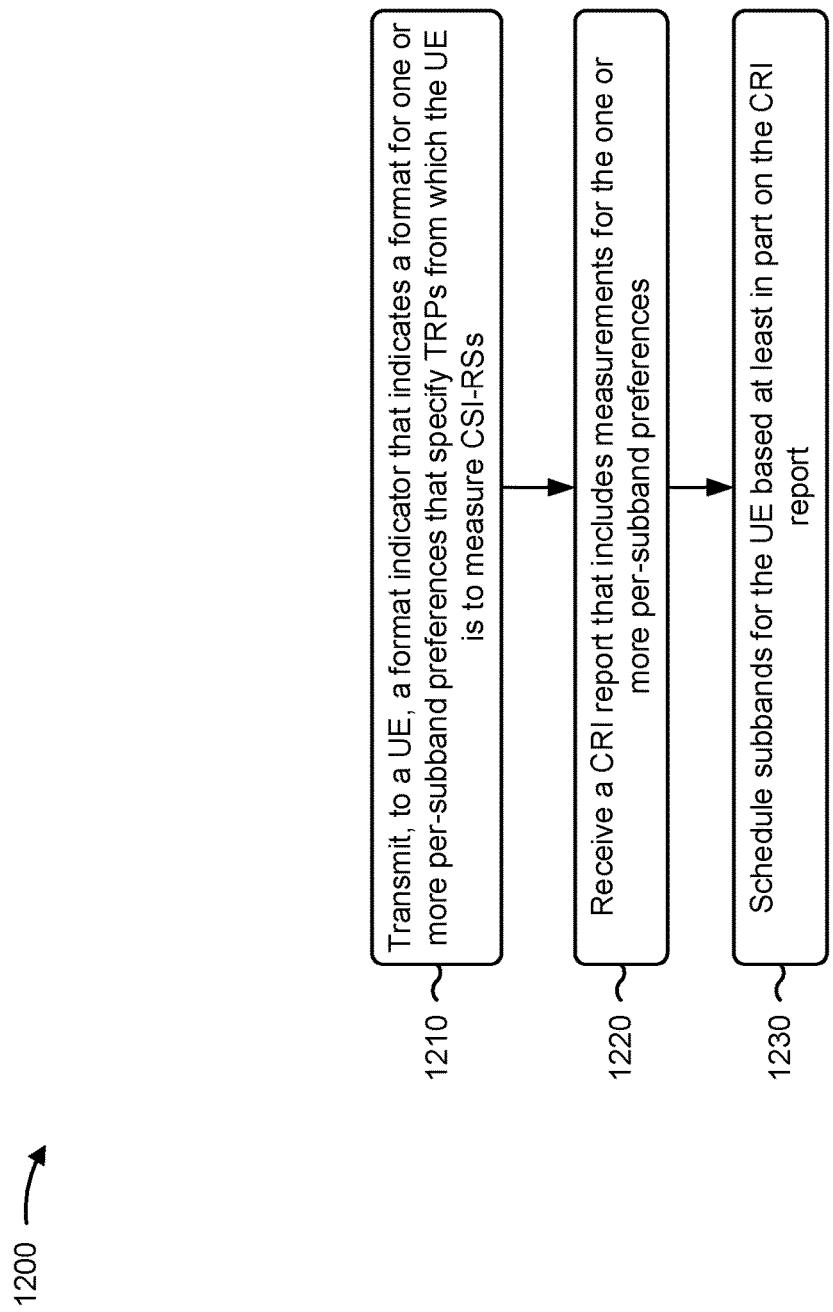
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where the base station (e.g., a BS 110 depicted in FIGS. 1 and 2, a BS 910 depicted in FIG. 9, and/or the like) performs operations associated with subband report for CSI of multiple TRPs.

As shown in FIG. 12, in some aspects, process 1200 may include transmitting, to a UE, a format indicator that indicates a format for one or more per-subband preferences that specify TRPs from which the UE is to measure CSI-RSs (block 1210). For example, the base station (e.g., using transmit processor 220, receive processor 238, controller/processor 240, memory 242, and/or the like) may transmit, to a UE, a format indicator that indicates a format for one or more per-subband preferences that specify TRPs from which the UE is to measure CSI-RSs, as described above.

As further shown in FIG. 12, in some aspects, process 1200 may include receiving a CRI report that includes measurements for the one or more per-subband preferences (block 1220). For example, the base station (e.g., using transmit processor 220, receive processor 238, controller/processor 240, memory 242, and/or the like) may receive a CRI report that includes measurements for the one or more per-subband preferences, as described above.

As further shown in FIG. 12, in some aspects, process 1200 may include scheduling subbands for the UE based at least in part on the CRI report (block 1230). For example, the base station (e.g., using transmit processor 220, receive processor 238, controller/processor 240, memory 242, and/or the like) may schedule subbands for the UE based at least in part on the CRI report, as described above.

Process 1200 may include additional aspects, such as any single aspect or any combination of aspects described below and/or in connection with one or more other processes described elsewhere herein.

In a first aspect, the format indicator indicates that the UE is to select a single preference per subband.

In a second aspect, alone or in combination with the first aspect, the format indicator indicates that the UE is to select two or more preferences per subband.

In a third aspect, alone or in combination with one or more of the first and second aspects, the format indicator indicates that the one or more per-subband preferences are to be the same for all subbands.

In a fourth aspect, alone or in combination with one or more of the first through third aspects, the format indicator indicates that the UE is to select a RI and a CQI value per subband.

In a fifth aspect, alone or in combination with one or more of the first through fourth aspects, the CSI-RSs include one or more of CSI-RSs for channel measurements, CSI-RSs for IM, or NZP CSI-RSs for IM.

In a sixth aspect, alone or in combination with one or more of the first through fifth aspects, process 1200 includes transmitting a size indicator that indicates whether a CRBG size for the CRI report is a same size as a subband size of a CSI report configuration.

In a seventh aspect, alone or in combination with one or more of the first through sixth aspects, the size indicator is set to true to indicate that the CRBG size for the CRI report is a size indicated in a specified table.

In an eighth aspect, alone or in combination with one or more of the first through seventh aspects, the size indicator is set to false to indicate that the CRBG size for the CRI report is a size specified in a configuration message.

In a ninth aspect, alone or in combination with one or more of the first through eighth aspects, process 1200 includes transmitting a size indicator that indicates whether a CRBG size is an integer multiple of a subband size of a CSI report configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining one or more per-subband preferences, that specify transmission reception points (TRPs) from which the UE is to measure channel state information reference signals (CSI-RSs), based at least in part on a CSI-RS resource indicator (CRI) format indicator that indicates a quantity of preferences per subband;
   preparing a CRI report based at least in part on the one or more per-subband preferences and on whether a CRI report resource block group (CRBG) size is (i) a same size as a subband size of a CSI report configuration or is (ii) an integer multiple of the subband size, based at least in part on a size indicator; and
   transmitting the CRI report.

2. The method of claim 1, wherein the CRI format indicator indicates that the UE is to select a single preference per subband.

3. The method of claim 2, wherein a preference selected for one subband is different than a preference selected for another subband.

4. The method of claim 1, wherein the CRI format indicator indicates that the UE is to select two or more preferences per subband.

5. The method of claim 1, wherein the CRI format indicator indicates that the one or more per-subband preferences are the same for all subbands.

6. The method of claim 1, wherein the CRI format indicator indicates that the UE is to select a rank indicator and a channel quality indicator value per subband.

7. The method of claim 1, wherein the CSI-RSs include one or more of CSI-RSs for channel measurements, CSI-RSs for interference measurement, or non-zero power CSI-RSs for interference measurement.

8. The method of claim 1, further comprising receiving the CRI format indicator from a network entity.

9. The method of claim 1, wherein preparing the CRI report comprises determining the CRBG size is the same size as the subband size.

10. The method of claim 9, further comprising determining the CRBG size for the CRI report to be a size indicated in a specified table based at least in part on the size indicator being set to true.

11. The method of claim 9, further comprising determining the CRBG size for the CRI report to be a size specified in a configuration message based at least in part on the size indicator being set to false.

12. The method of claim 1, wherein preparing the CRI report comprises determining the CRBG size is the integer multiple of the subband size.

13. The method of claim 1, wherein preparing the CRI report comprises:
   measuring CSI-RSs from TRPs according to the one or more per-subband preferences; and
   preparing the CRI report based at least in part on measuring the CSI-RSs.

14. A method of wireless communication performed by a network entity, comprising:
   transmitting a format indicator that indicates a format for one or more per-subband preferences that specify transmission reception points (TRPs) from which a user equipment (UE) is to measure channel state information reference signals (CSI-RSs), and a size indicator that indicates whether a CSI-RS resource indicator (CRI) report resource block group (CRBG) size is to be (i) a same size as a subband size of a CSI report configuration or is (ii) an integer multiple of the subband size;
   receiving a CRI report that includes measurements for the one or more per-subband preferences and is based at least in part on the size indicator; and
   scheduling subbands for the UE based at least in part on the CRI report.

15. The method of claim 14, wherein the format indicator indicates that the UE is to select a single preference per subband.

16. The method of claim 14, wherein the format indicator indicates that the UE is to select two or more preferences per subband.

17. The method of claim 14, wherein the format indicator indicates that the one or more per-subband preferences are to be the same for all subbands.

18. The method of claim 14, wherein the format indicator indicates that the UE is to select a rank indicator and a channel quality indicator value per subband.

19. The method of claim 14, wherein the CSI-RSs include one or more of CSI-RSs for channel measurements, CSI-RSs for interference measurement, or non-zero power CSI-RSs for interference measurement.

20. The method of claim 14, wherein the size indicator indicates that the CRBG size is the same size as the subband size.

21. The method of claim 20, wherein the size indicator is set to true to indicate that the CRBG size for the CRI report is a size indicated in a specified table.

22. The method of claim 20, wherein the size indicator is set to false to indicate that the CRBG size for the CRI report is a size specified in a configuration message.

23. The method of claim 14, wherein the size indicator indicates that the CRBG size is the integer multiple of the subband size.

24. A user equipment (UE) for wireless communication, comprising:
   one or more memories; and
   one or more processors coupled to the one or more memories, the one or more processors configured to:
      determine one or more per-subband preferences, that specify transmission reception points (TRPs) from which the UE is to measure channel state information reference signals (CSI-RSs), based at least in part on a CSI-RS resource indicator (CRI) format indicator that indicates a quantity of preferences per subband;
      prepare a CRI report based at least in part on the one or more per-subband preferences and on whether a CRI report resource block group (CRBG) size is (i) a same size as a subband size of a CSI report configuration or is (ii) an integer multiple of the subband size, based at least in part on a size indicator; and
      transmit the CRI report.

25. A network entity for wireless communication, comprising:
   one or more memories; and
   one or more processors coupled to the one or more memories, the one or more processors configured to:
      transmit a format indicator that indicates a format for one or more per-subband preferences that specify transmission reception points (TRPs) from which a user equipment (UE) is to measure channel state information reference signals (CSI-RSs), and a size indicator that indicates whether a CSI-RS resource indicator (CRI) report resource block group (CRBG)

size is to be (i) a same size as a subband size of a CSI report configuration or is (ii) an integer multiple of the subband size;

receive a CRI report that includes measurements for the one or more per-subband preferences and is based at least in part on the size indicator; and schedule subbands for the UE based at least in part on the CRI report.

\* \* \* \* \*